(12) United States Patent
Lee

(10) Patent No.: US 9,721,614 B2
(45) Date of Patent: Aug. 1, 2017

(54) DISPLAY DEVICE AND CONTROL METHOD THEREOF

(71) Applicant: LG ELECTRONICS INC., Seoul (KR)

(72) Inventor: Kyoungha Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/119,280

(22) PCT Filed: Apr. 14, 2014

(86) PCT No.: PCT/KR2014/003173
§ 371 (c)(1),
(2) Date: Aug. 16, 2016

(87) PCT Pub. No.: WO2015/122563
PCT Pub. Date: Aug. 20, 2015

(65) Prior Publication Data
US 2017/0011773 A1 Jan. 12, 2017

(30) Foreign Application Priority Data
Feb. 17, 2014 (KR) .......... 10-2014-0017938

(51) Int. Cl.
*H04N 9/80* (2006.01)
*G11B 27/28* (2006.01)
(Continued)

(52) U.S. Cl.
CPC ............ *G11B 27/28* (2013.01); *G11B 27/034* (2013.01); *G11B 27/34* (2013.01); *H04N 5/9201* (2013.01);
(Continued)

(58) Field of Classification Search
CPC ....... G11B 27/28; G11B 27/034; G11B 27/34; H04N 21/47217; H04N 21/8153; H04N 21/8455; H04N 5/9201
(Continued)

(56) References Cited

U.S. PATENT DOCUMENTS 8,818,164 B2 * 8/2014 Park ................... H04N 21/4147
386/241
8,953,928 B2 * 2/2015 Beacham ........... H04N 21/4334
386/239
(Continued)

FOREIGN PATENT DOCUMENTS

KR 10-2004-0041082 A 5/2004
KR 10-2012-0116288 A 10/2012

*Primary Examiner* — Robert Chevalier
(74) *Attorney, Agent, or Firm* — Birch, Stewart, Kolasch & Birch, LLP

(57) ABSTRACT

Disclosed is a control method of a display device including displaying a playback screen of video images, the playback screen of the video images showing one video image and a progress bar to visualize the progression of the video images, acquiring time information regarding respective bookmark images associated with the video images, the bookmark images respectively including the time information in the sequence of the video images and/or frame information regarding one video image corresponding to the time information, and displaying the bookmark images close to the progress bar at positions corresponding to the time information regarding the respective bookmark images. When a difference between first time information regarding a first bookmark image and second time information regarding a second bookmark image is a time threshold or less, the first and second bookmark images among the bookmark images are displayed as overlapping each other.

20 Claims, 6 Drawing Sheets

(51) Int. Cl.
| | |
|---|---|
| *H04N 21/472* | (2011.01) |
| *H04N 21/81* | (2011.01) |
| *H04N 21/845* | (2011.01) |
| *G11B 27/034* | (2006.01) |
| *G11B 27/34* | (2006.01) |
| *H04N 5/92* | (2006.01) |

(52) U.S. Cl.
CPC ... *H04N 21/47217* (2013.01); *H04N 21/8153* (2013.01); *H04N 21/8455* (2013.01)

(58) Field of Classification Search
USPC .............. 386/241, 239, 243, 248, 278, 290
See application file for complete search history.

(56) References Cited

U.S. PATENT DOCUMENTS

| | | | |
|---|---|---|---|
| 9,179,031 B2 * | 11/2015 | Kon | ............... H04N 5/772 |
| 2011/0093492 A1 | 4/2011 | Sull et al. | |
| 2012/0047437 A1 | 2/2012 | Chan | |
| 2013/0019263 A1 | 1/2013 | Ferren et al. | |

* cited by examiner

DISPLAY DEVICE AND CONTROL METHOD THEREOF

CROSS REFERENCE TO RELATED APPLICATIONS

This application is the National Phase of PCT International Application No. PCT/KR2014/003173, filed on Apr. 14, 2014, which claims priority under 35 U.S.C. 119(a) to Patent Application No. 10-2014-0017938, filed in the Republic of Korea on Feb. 17, 2014, all of which are hereby expressly incorporated by reference into the present application.

TECHNICAL FIELD

The present specification relates to a display device, and more particularly to a display device for playback of video images which belong to a sequence.

BACKGROUND ART

A display device may have video capability and a function of playback of recorded video images which belong to a sequence. Upon playback of video images, the display device may further display a preview image along with each video image of the sequence. The display device may shift a playback point in time in response to a user input based on the preview image, and play back the video images starting from the corresponding point in time.

DISCLOSURE OF INVENTION

Technical Problem

However, a conventional display device is configured to display a preview image at a predetermined time interval. Thus, the display device may need to provide a bookmark image with regard to a playback point in time set by a user.

Solution to Problem

Accordingly, the present specification is directed to a display device and a control method thereof that substantially obviate one or more problems due to limitations and disadvantages of the related art.

An object of the present specification is to provide a display device and a control method thereof, which may set a playback point in time for provision of a bookmark image with regard to video images being played back in the display device, and may display the bookmark image.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device includes a display unit configured to display a playback screen of video images which belong to a sequence, a sensor unit configured to detect a control input, and a controller configured to control the display unit and the sensor unit, wherein the playback screen of the video images includes one of the video images, bookmark images associated with the video images, and a progress bar configured to visualize the progression of the video images, wherein the bookmark images respectively include at least one of time information in the sequence of the video images and frame information regarding one of the video images corresponding to the time information, wherein the bookmark images are displayed close to the progress bar at positions corresponding to the time information regarding the respective bookmark images, and wherein the controller overlaps a first bookmark image and a second bookmark image among the bookmark images each other and displays the overlapped bookmark images when a difference between first time information regarding the first bookmark image and second time information regarding the second bookmark image is a time threshold or less.

In accordance with another embodiment of the present specification, a control method of a display device, includes displaying a playback screen of video images which belong to a sequence, wherein the playback screen of the video images contains one of the video images and a progress bar configured to visualize the progression of the video images, acquiring time information regarding respective bookmark images associated with the video images, wherein the bookmark images respectively include at least one of the time information in the sequence of the video images and frame information regarding one of the video images corresponding to the time information, and displaying the bookmark images close to the progress bar at positions corresponding to the time information regarding the respective bookmark images, wherein a first bookmark image and a second bookmark image among the bookmark images are displayed as overlapping each other when a difference between first time information regarding the first bookmark image and second time information regarding the second bookmark image is a time threshold or less.

It is to be understood that both the foregoing general description and the following detailed description of the present specification are exemplary and explanatory and are intended to provide further explanation of the specification as claimed.

Advantageous Effects of Invention

According to the present specification, the display device may determine a position of a bookmark image based on time information regarding a still image captured during recording of video images which belong to a sequence.

According to the present specification, the display device may store a still image, captured during recording of video images which belong to a sequence, as a bookmark image with regard to the video images.

According to the present specification, the display device may display a still image, captured during recording of video images which belong to a sequence, as a bookmark image.

According to the present specification, the display device may play back video images starting from a playback point in time corresponding to a bookmark image when a control input to the bookmark image is detected.

According to the present specification, the display device may store a bookmark image including time information and frame information in conjunction with an associated one of video images which belong to a sequence.

According to the present specification, when a plurality of bookmark images is displayed along with one of video images which belong to a sequence, the display device may overlap two or more sequential bookmark images based on time information regarding the bookmark images, and display the overlapped bookmark images.

According to the present specification, when a control input to bookmark images displayed as overlapping each other is detected, the display device may spread the overlapped bookmark images, and display the respective bookmark images.

According to the present specification, when spreading overlapped bookmark images, the display device may determine a vertical or horizontal spread direction of the bookmark images based on time information regarding the bookmark images.

According to the present specification, when a control input to bookmark images displayed as overlapping each other is detected, the display device may change the overlap sequence of the bookmark images, and display the bookmark images in the changed sequence.

BRIEF DESCRIPTION OF DRAWINGS

The accompanying drawings, which are included to provide a further understanding of the specification and are incorporated in and constitute a part of this application, illustrate embodiment(s) of the specification and together with the description serve to explain the principle of the specification. In the drawings.

BEST MODE FOR CARRYING OUT THE INVENTION

Hereinafter, various embodiments will be described in detail with reference to the attached drawings and illustrations thereof, but it should be understood that the present specification is not restricted or limited by the embodiments that will be described hereinafter.

Although the terms used in the following description are selected, as much as possible, from general terms that are widely used at present while taking into consideration the functions obtained in accordance with the present specification, these terms may be replaced by other terms based on intensions of those skilled in the art, customs, emergence of new technologies, or the like. Also, in a particular case, terms that are arbitrarily selected by the applicant of the present specification may be used. In this case, the meanings of these terms may be described in corresponding description parts of the specification. Accordingly, it should be noted that the terms used herein should be construed based on practical meanings thereof and the whole content of this specification, rather than being simply construed based on names of the terms.

In the present specification, a display device may include a smart phone, a smart pad, a laptop computer, a tablet computer, a monitor, a wall display, or a smart table.

Figure 1:
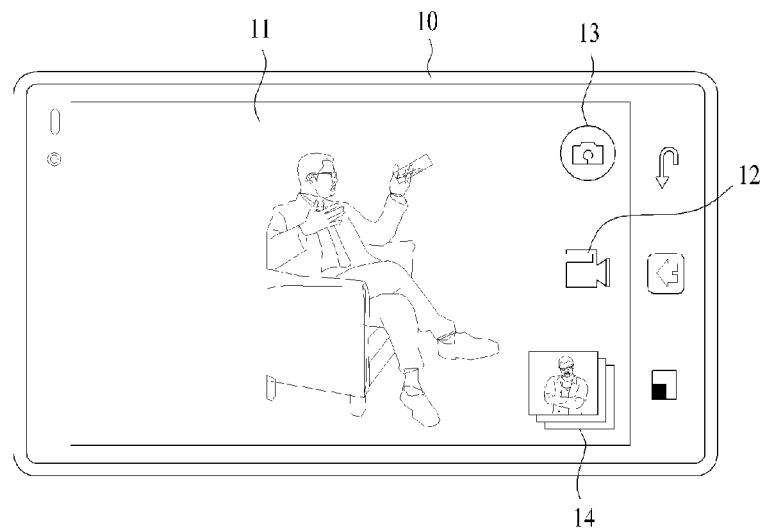
FIG. 1 is a view showing a recording interface to record video images which belong to a sequence, included in a display device in accordance with one embodiment of the present specification.

FIG. 1 is a view showing a recording interface to record video images which belong to a sequence, included in a display device in accordance with one embodiment of the present specification. Upon display of the recording interface to record video images which belong to a sequence, the display device 10 may display video images 11 being recorded. In addition, the display device 10 may display a video image trigger 12 and a still image trigger 13 together. The display device 10 may further display a preview image or thumbnail image 14 of a still image captured during recording of the video images 11.

The display device 10 may record the video images 11 which belong to a sequence upon detecting a control input to the video image trigger 12. The display device 10 may store the successive video images 11 of an object. Upon detecting a control input to the still image trigger 13 during recording of the video images 11, the display device 10 may capture one of the video images 11, displayed on a display unit at a point in time when the control input is detected, as a still image. The display device 10 may display the thumbnail image 14 of the captured still image along with the recording interface to record video images. In the case in which a plurality of still images is captured during recording of the video images, the display device 10 may display a plurality of preview images 14 corresponding to the respective still images. The display device 10 may overlap the preview images 14 each other and display the overlapped preview images 14 as exemplarily shown in FIG. 1. In addition, when a still image is captured, the display device 10 may store at least one of time information and frame information regarding the still image in the sequence of the video images in conjunction with the still image. Although operation of the display device based on time information in the present specification will be described below, naturally, this operation may be equally applied even to operation of the display device based on frame information.

Figure 2:
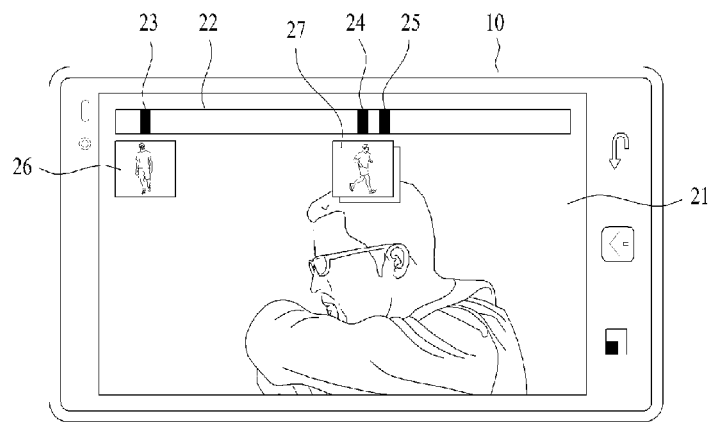
FIG. 2 is a view showing a playback interface for playback of video images, included in the display device in accordance with one embodiment of the present specification.

FIG. 2 is a view showing a playback interface for playback of video images, included in the display device in accordance with one embodiment of the present specification. The display device 10 may play back recorded video images. Upon display of the playback interface, the display device 10 may display a progress bar along with one of the video images. Here, the progress bar is used to visualize and control the progression of the video images. The display device 10 may display an indicator, used to indicate a point bookmarked by a user, on the progress bar. In addition, the display device 10 may display a bookmark image with regard to the bookmarked point at a position close to the progress bar.

The display device 10 may play back video images 21 which belong to a sequence. Here, the video images 21 may be video images recorded via the recording interface, or video images downloaded via a network. The display device 10 may display a progress bar 22 along with the video images 21, and the user may check and control the progression of the video images 21 being played back via the progress bar 22. The display device 10 may display information, regarding a still image associated with the video images 21, on the progress bar 22 or on a region close to the progress bar 22. Here, the still image associated with the video images 21 may include a still image captured during recording of the video images 21, or a still image captured during playback of the video images 21. When the still image is captured during recording or playback of the video images 21, the display device 10 may store time information in the sequence of the video images 21 in conjunction with the captured still image. Hereinafter, the still image stored in conjunction with the time information in the sequence of the video images 21 may be referred to as a bookmark image.

The display device 10 may check whether or not a bookmark image is present upon playback of the video images 21. When the bookmark image with regard to the video images 21 being played back is present, the display device 10 may display an indicator, used to indicate the bookmark image, on the progress bar 22 using time information regarding the bookmark image. For example, in the case in which a first bookmark image, a second bookmark image, and a third bookmark image with regard to the video images 21 being played back as exemplarily shown in FIG. 2 are stored, the display device 10 may display a first indicator 23 corresponding to first time information regarding the first bookmark image, a second indicator 24 corresponding to second time information regarding the second bookmark image, and a third indicator 25 corresponding to third time information regarding the third bookmark image on the progress bar 22.

In addition, the display device 10 may display the first bookmark image 26 at a position close to the progress bar 22. More particularly, the display device 10 may display the first bookmark image 26 at a position close to one point on the progress bar 22 corresponding to first time information regarding the first bookmark image 26. Likewise, the display device 10 may display the second bookmark image 27 and the third bookmark image at positions close to respective points on the progress bar 22 corresponding to second time information regarding the second bookmark image 27 and third time information regarding the third bookmark image.

In this case, when a difference between the second time information and the third time information is a time threshold or less, the display device 10 may overlap the second bookmark image 27 and the third bookmark image each other, and display the overlapped bookmark images. The overlapped second and third bookmark images may be sequential images. Here, the time threshold may be changed based on the size of the bookmark images and the entire playback time of the video images 21. That is, the display device 10 may set the time threshold in proportion to the size of the bookmark images, and may set the time threshold in proportion to the entire playback time of the video images 21. In one example, the display device 10 may set the time threshold to a first time when the bookmark images have a first size, and may set the time threshold to a second time when the bookmark images have a second size. Here, when the first size is greater than the second size, the display device 10 may set the first time to be greater than the second time. In another example, the display device 10 may set the time threshold to a third time when the entire playback time of the video images is a first playback time, and may set the time threshold to a fourth time when the entire playback time of the video images is a second playback time. Here, when the first playback time is greater than the second playback time, the display device 10 may set the third time to be greater than the fourth time.

In the case in which the second bookmark image 27 and the third bookmark image overlap each other, the display device 10 may determine an overlap method based on time information regarding the respective bookmark images. When the second time information regarding the second bookmark image 27 is earlier than the third time information regarding the third bookmark image, the display device 10 may overlap the third bookmark image with the second bookmark image 27. As such, the display device 10 may display the second bookmark image 27 as exemplarily shown in FIG. 2. In addition, the display device 10 may further display an overlap indicator with regard to the overlapped third bookmark image. As the overlap indicator with regard to the overlapped third bookmark image, the display device 10 may display the shape of an image hidden by the second bookmark image 27. In this way, the user may check the presence of the third bookmark image via the third indicator 25 corresponding to time information regarding the third bookmark image and the overlap indicator with regard to the third bookmark image.

The display device 10 may add a playback indicator (not shown) to the playback interface. The display device 10 may play back the video images starting from the beginning upon detecting a control input to the playback indicator (not shown).

Figure 3:
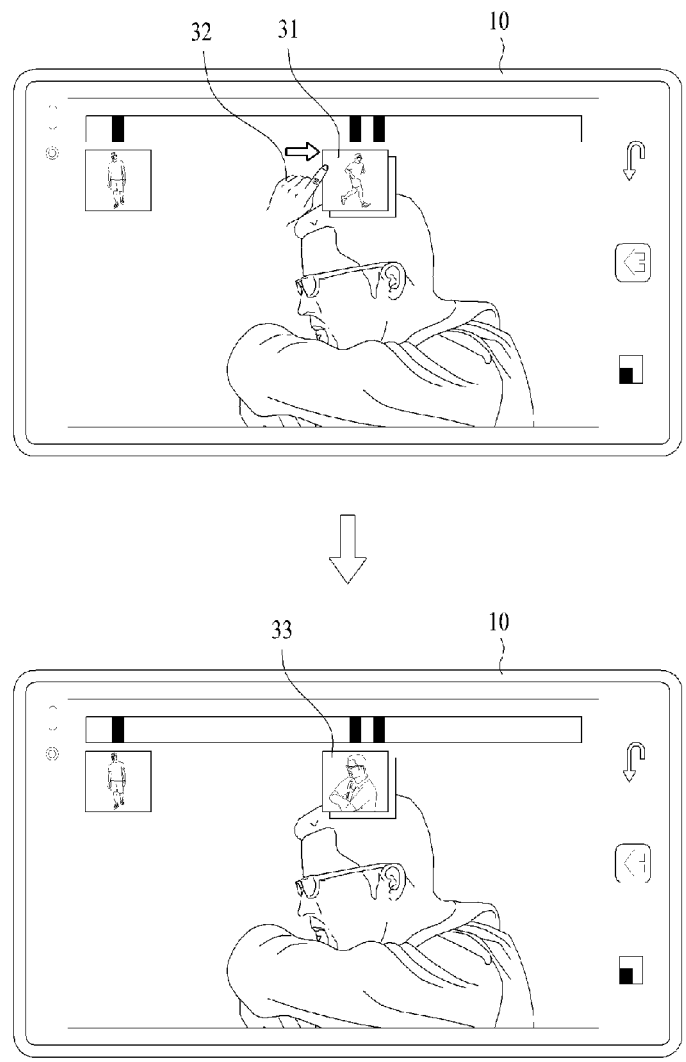
FIG. 3 is a view showing a method of changing the overlap sequence of bookmark images via the playback interface included in the display device in accordance with one embodiment of the present specification.

FIG. 3 is a view showing a method of changing the overlap sequence of bookmark images via the playback interface included in the display device in accordance with one embodiment of the present specification. When a control input to a plurality of overlapped bookmark images is input, the display device 10 may replace one displayed bookmark image with the other bookmark image, and display the replaced bookmark image.

As exemplarily shown at the upper end of FIG. 3, the display device 10 may display a first bookmark image, a second bookmark image, and a third bookmark image based on the sequence of time information. Here, the second bookmark image and the third bookmark image may be displayed as overlapping each other based on a difference between second time information and third time information. As exemplarily shown at the upper end of FIG. 3, the display device 10 may display a second bookmark image 31 overlapping a third bookmark image. As such, the display device 10 may display the second bookmark image 31, and display an overlap indicator with regard to the third bookmark image. Here, second time information regarding the second bookmark image may be earlier than third time information regarding the third bookmark image.

The display device 10 may detect a control input 32 to the overlapped bookmark images 31. The control input 32 may be a sliding input as a touch on the display unit that displays the overlapped bookmark images 31. Alternatively, the control input 32 may be a hovering input of hovering over the display unit that displays the overlapped bookmark images 31.

The display device 10 may change the overlap sequence of the displayed bookmark images based on the control input 32 to replace the overlapped bookmark images with each other. That is, the display device 10 may replace the displayed second bookmark image 31 with the third bookmark image overlapped with the second bookmark image 31. As exemplarily shown at the lower end of FIG. 3, the display device 10 may display the third bookmark image 33 and display an overlap indicator with regard to the second bookmark image.

In this way, the user may check the overlapped bookmark images using the control input to replace the overlapped bookmark images with each other.

Figure 4:
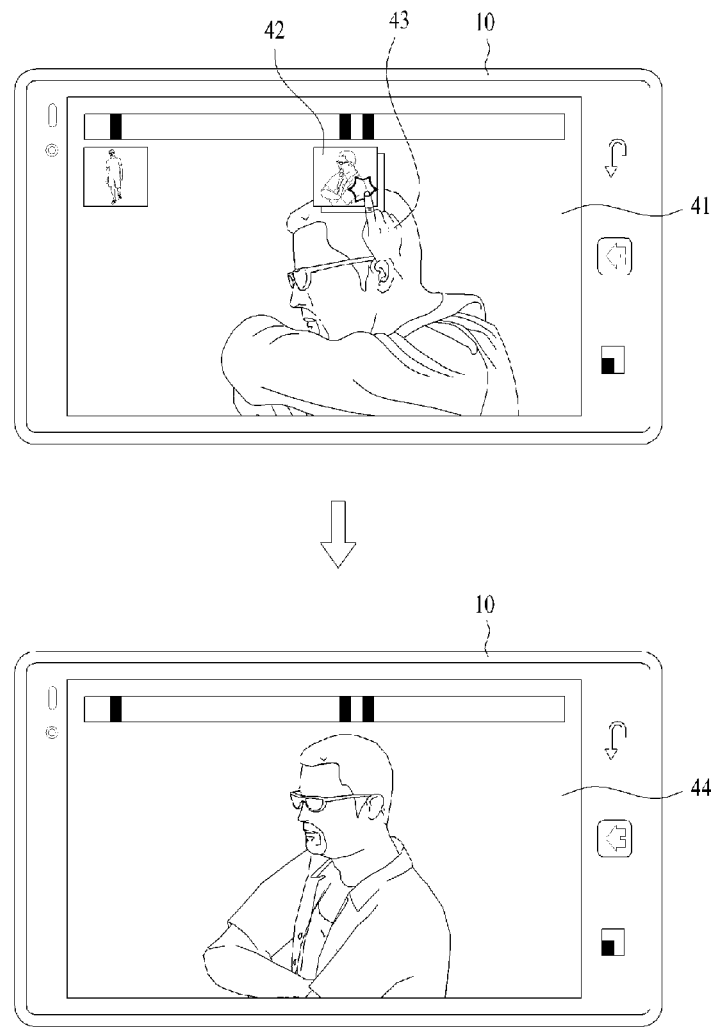
FIG. 4 is a view showing a method of selecting a bookmark image and playing video images starting from a point in time corresponding to the bookmark image via the playback interface included in the display device in accordance with one embodiment of the present specification.

FIG. 4 is a view showing a method of selecting a bookmark image and playing video images starting from a point in time corresponding to the bookmark image via the playback interface included in the display device in accordance with one embodiment of the present specification. The display device 10 may change a playback point in time of video images in response to a control input to select a displayed bookmark image.

The display device 10 may display one of video images 41 corresponding to a playback point in time. When a control input 43 to select a displayed bookmark image 42 is detected, the display device 10 may change a playback point in time to a point in time corresponding to time information regarding the selected bookmark image 42. The display device 10 may play back video images starting from a frame 44 corresponding to the changed playback point in time. Here, the bookmark image 42 and the frame 44 corresponding to the time information regarding the bookmark image 42 may show the same image. In addition, the bookmark image may include frame information, and the display device 10 may change a playback frame to the frame 44 corresponding to frame information regarding the selected bookmark image 42.

In the above described case as exemplarily shown at the upper end of FIG. 3, when a control input to select the displayed second bookmark image 31 is detected, the display device 10 may play back video images starting from a frame corresponding to time information regarding the second bookmark image 31. In addition, when the second bookmark image is replaced with the third bookmark image 33 and thereafter, a control input to select the third bookmark image 33 is detected, the display device 10 may play back video images starting from a frame corresponding to time information regarding the third bookmark image 33.

Figure 5:
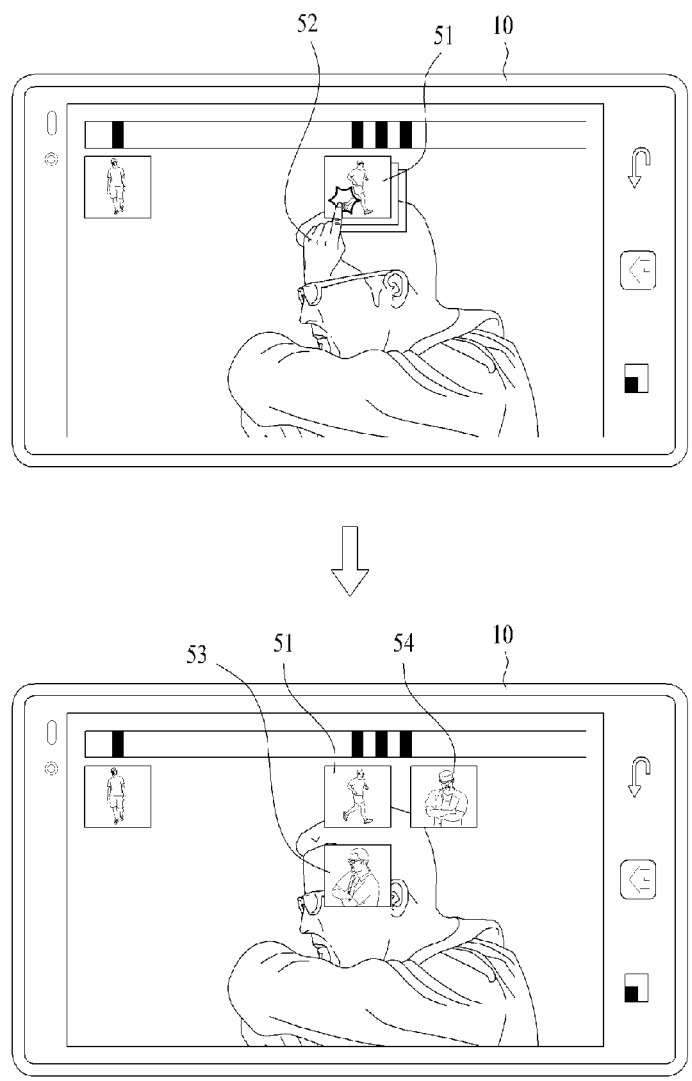
FIG. 5 is a view showing a method of spreading bookmark images in the display device in accordance with one embodiment of the present specification.

FIG. 5 is a view showing a method of spreading bookmark images in the display device in accordance with one embodiment of the present specification. When a control input to spread a plurality of overlapped bookmark images is detected, the display device 10 may spread the overlapped bookmark images and display the respective bookmark images.

The display device 10, as exemplarily shown at the upper end of FIG. 5, may display a first bookmark image, a second bookmark image 51, a third bookmark image, and a fourth bookmark image based on the sequence of time information. The display device 10 may overlap the bookmark images one another when a difference between time information regarding the respective bookmark images is a time threshold or less, and display the overlapped bookmark images. As exemplarily shown at the upper end of FIG. 5, the display device 10 may overlap the second bookmark image, the third bookmark image, and the fourth bookmark image one another, and display the overlapped bookmark images. The display device 10 may detect a control input 52 to spread the overlapped bookmark images. The control input 52 may be a sliding input as a touch on the display unit that displays the overlapped bookmark images. Alternatively, the control input 52 may be a hovering input of hovering over the display unit that displays the overlapped bookmark images.

When the control input 52 to spread the overlapped bookmark images is detected, the display device 10 may spread the overlapped bookmark images and display the respective bookmark images. That is, the display device may spread the bookmark images displayed overlapping one another, so as to display the second bookmark image 51, the third bookmark image 53, and the fourth bookmark image 54 respectively.

Upon spreading the bookmark images, the display device 10 may determine a spread direction based on a difference between time information regarding the respective bookmark images. When a difference between second time information regarding the second bookmark image 51 and third time information regarding the third bookmark image 53 is a first time threshold or less, the display device 10 may spread the second bookmark image 51 and the third bookmark image 53 up and down. That is, the third bookmark image 53 may be displayed below the second bookmark image 51.

In addition, when a difference between second time information regarding the second bookmark image 51 and fourth time information regarding the fourth bookmark image 54 exceeds the first time threshold and is a second time threshold or less, the display device 10 may spread the second bookmark image 51 and the fourth bookmark image 54 next to each other. That is, the fourth bookmark image 54 may be displayed at the right side of the second bookmark image 51.

That is, the display device 10 may set time information regarding the earliest bookmark image among the overlapped bookmark images to reference time information, and may determine a spread direction of the bookmark images based on a difference between time information regarding the respective bookmark images. Accordingly, the display device 10 may spread the overlapped bookmark images in multiple directions in a 2-dimensional plane.

Figure 6:
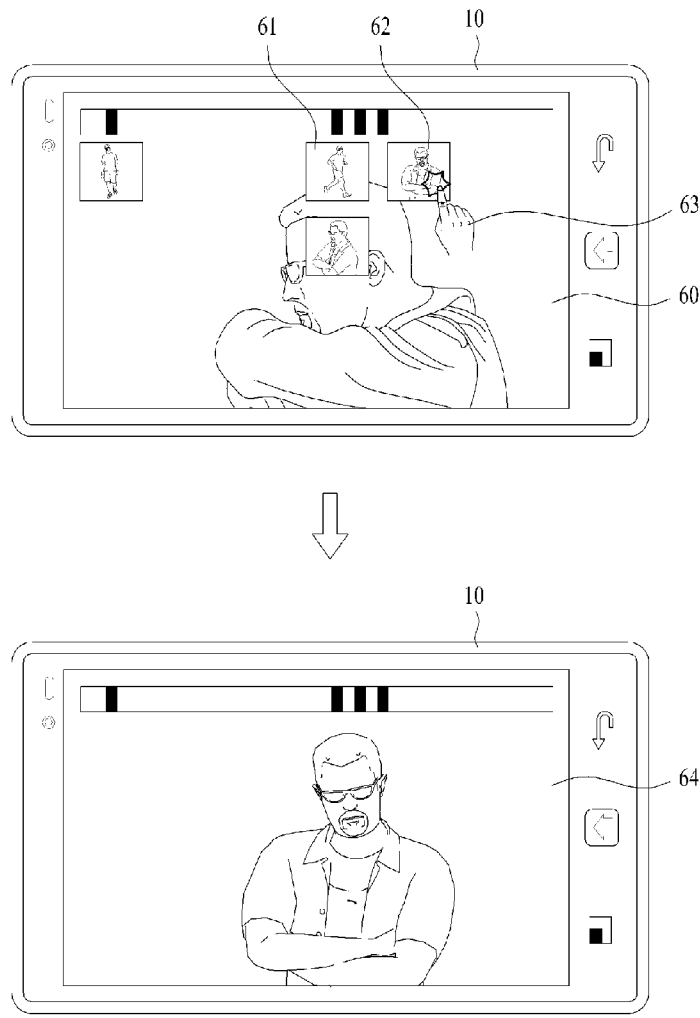
FIG. 6 is a view showing a method of selecting one of spread bookmark images and playing video images starting from a point in time corresponding to the selected bookmark image via the playback interface included in the display device in accordance with one embodiment of the present specification.

FIG. 6 is a view showing a method of selecting one of spread bookmark images and playing video images starting from a point in time corresponding to the selected bookmark image via the playback interface included in the display device in accordance with one embodiment of the present specification. The display device 10 may change a playback point in time of video images in response to a control input to select one of spread bookmark images.

The display device 10 may display one of video images 60 corresponding to a playback point in time. When a control input 63 to select one of spread bookmark images 61 and 62 is detected, the display device 10 may change a playback point in time to a point in time corresponding to time information regarding the selected bookmark image 62. The display device 10 may play back video images starting from a frame 64 corresponding to the changed playback point in time. Here, the bookmark image 62 and the frame 64 corresponding to time information regarding the bookmark image 62 may show the same image. In addition, the bookmark image may include frame information, and the display device 10 may change a playback frame to the frame 64 corresponding to frame information regarding the selected bookmark image 62. When the playback point in time or the playback frame is changed, the display device 10 may remove the displayed bookmark images from the playback interface. In this case, according to embodiments, the display device 10 may continuously display indicators with regard to the displayed bookmark images on the progress bar.

Figure 7:
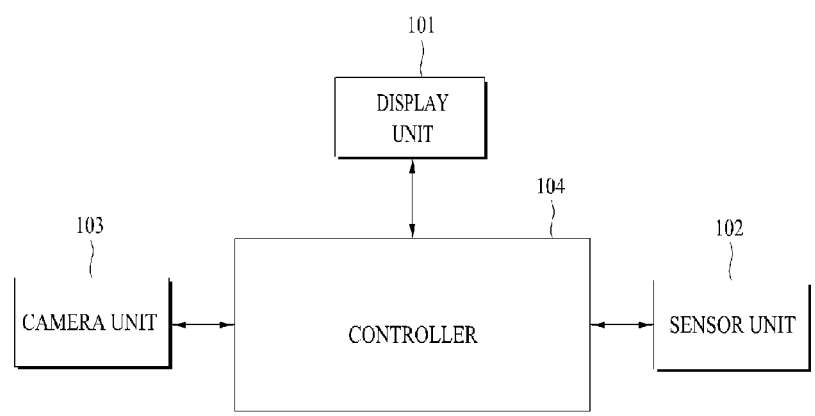
FIG. 7 is a block diagram of the display device in accordance with one embodiment of the present specification.

FIG. 7 is a block diagram of the display device in accordance with one embodiment of the present specification. The display device may include a display unit 101, a sensor unit 102, a camera unit 103, and a controller 104. In addition, the display device may further include a separable flip cover. Although not shown in FIG. 7, the display device may further include an optional storage unit.

The display unit 101 may display video images which belong to a sequence. As described above with reference to FIGS. 1 to 6, the display unit 101 may display a recording interface or a playback interface for the video images. The display unit 101 may display video images being recorded via the recording interface, a video image trigger, a still image trigger, and a preview image of a still image captured during recording of the video images. In addition, the display unit 101 may display video images being played back via the playback interface, a progress bar to visualize the progression of the video images, a bookmark image, and an indicator with regard to the bookmark image.

The display unit 101, according to embodiments, may include at least one of a Light Emitting Diode (LED) display, an Organic Light Emitting Diode (OLED) display, a Liquid Crystal Display (LCD), an electronic ink display, and a flexible display. The display unit 101 may include a touch sensitive display unit, and may detect a control input as a touch on the display unit 101.

The sensor unit 102 may detect a control input to the recording interface and the playback interface. The sensor unit 102 may detect a touch input as well as a non-touch input such as a hovering input. The sensor unit 102 may detect whether an input to a bookmark image is a replacement input or a selection input, and may transmit information regarding the detected input to the controller 104.

The camera unit 103 may record video images and capture a still image upon sensing of an external object. When a control input to the still image trigger is input during recording of the video images, the camera unit 103 may store one of the video images captured at a corresponding point in time as a still image.

The controller 104 may control the display unit 101 and the camera unit 103 using information transmitted from the sensor unit 102. The controller 104, as described above with reference to FIGS. 1 to 6, may display a still image captured during recording of the video images. In addition, the controller 104 may store the still image captured during recording of the video images as a bookmark image with regard to the video images. In the case in which a still image is captured during recording of video images which belong to a sequence, the controller 104 may store the captured still image in association with the video images. The controller 104 may store information regarding a point in time when the still image is captured and information regarding a frame in the sequence of the video images together. In the case in which video images being played back, the controller 104 may display a bookmark image associated with the video images. In the case in which a plurality of bookmark images is displayed, the controller 104 may overlap the bookmark images each other based on time information regarding the respective bookmark images, and display the overlapped bookmark images. That is, the controller 104 may overlap two bookmark images each other and display the overlapped bookmark images when a difference between time information regarding the two bookmark images is a time threshold or less.

The display device may further include the optional storage unit in which video images which belong to a sequence and a still image are stored. The storage unit may store recorded video images and a still image captured during recording of the video images in association with each other. The controller 104 may store the video images and the still image in the same folder of the storage unit. In addition, the controller may store the still image as a bookmark image, and may store time information and frame information regarding the bookmark image in the sequence of the video images together in the storage unit.

FIG. 7 is a block diagram in accordance with one embodiment. In FIG. 7, separately shown blocks represent logically separated elements of the display device. Thus, the elements of the display device as described above may be mounted as one chip or a plurality of chips according to design of the display device.

Figure 8:
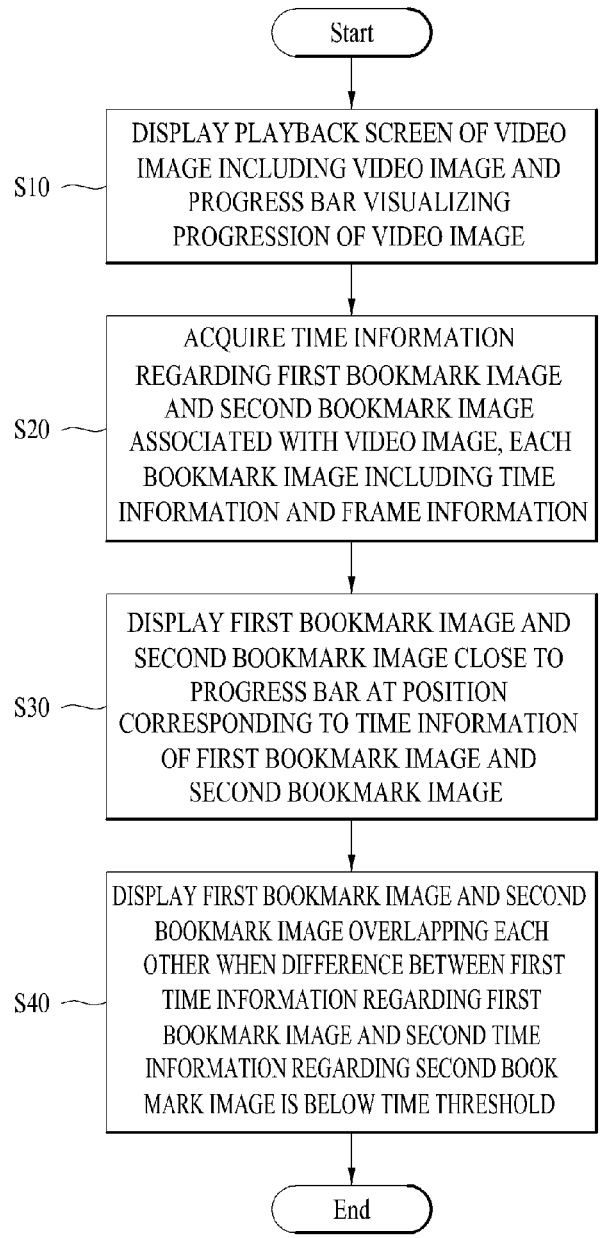
FIG. 8 is a flowchart showing operation of the display device in accordance with one embodiment of the present specification.

FIG. 8 is a flowchart showing operation of the display device in accordance with one embodiment of the present specification. The display device may display a playback screen of video images including each image (frame) among the video images and a progress bar to visualize the progression of the video images (S10). As described above with reference to FIG. 2, the display device may display a playback interface including each image (frame) among the video images and the progress bar to indicate and control a playback point in time of the corresponding video image. The display device may control a playback point in time of video image in response to a control input to the progress bar.

The display device may acquire time information regarding respective bookmark images, which are associated with the video images and respectively include at least one of time information and frame information (S20). The display device may acquire information regarding bookmark images associated with the video images. Then, the display device may acquire time information regarding the bookmark images. In addition, according to embodiments, the display device may acquire frame information regarding the bookmark images.

The display device may display the bookmark images at positions close to the progress bar corresponding to time information (S30). The display device may display indicators with regard to the bookmark images on the progress bar based on time information regarding the respective bookmark images. In addition, the display device may display bookmark images at positions close to the progress bar corresponding to time information regarding the respective bookmark images. Although position setting depending on time information has been described above, the display device may set positions of the bookmark images based on frame information.

When a difference between first time information regarding a first bookmark image and second time information regarding a second bookmark image among the bookmark images is a time threshold or less, the display device may overlap the first bookmark image and the second bookmark image each other and display the overlapped bookmark images (S40). The display device may determine whether or not to overlap the bookmark images each other based on time information regarding the bookmark images. When a difference between first time information regarding a first bookmark image and second time information regarding a second bookmark image is a time threshold or less, the display device may overlap the first bookmark image and the second bookmark image each other and display the overlapped bookmark images. As described above with reference to FIG. 2, the time threshold may be changed based on the size of the bookmark images and the entire playback time of video images which belong to a sequence. That is, the display device may set the time threshold in proportion to the size of the bookmark images, and may set the time threshold in proportion to the entire playback time of video images.

As described above, the display device of the present specification may store a still image captured during recording of video images as a bookmark image. In addition, the display device may display the bookmark image upon playback of the video images, thereby assisting the user in easily moving to a desired playback point in time.

As is apparent from the above description, according to the present specification, a display device may provide a bookmark image with regard to a playback point in time set by a user.

It will be apparent to those skilled in the art that various modifications and variations can be made in the present specification without departing from the spirit or scope of the specification. Thus, it is intended that the present specification covers the modifications and variations of this specification provided they come within the scope of the appended claims and their equivalents.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the present invention is totally or partially applicable to electronic devices.

The invention claimed is:

1. A display device comprising:
a display unit configured to display a playback screen of video images;
a sensor unit configured to detect a control input; and
a controller configured to control the display unit and the sensor unit,
wherein the playback screen of the video images includes one of the video images, bookmark images associated with the video images, and a progress bar configured to visualize the progression of the video images,
wherein the bookmark images respectively include at least one of time information in the video images and frame information regarding one of the video images corresponding to the time information,
wherein the bookmark images are displayed close to the progress bar at positions corresponding to the time information regarding the respective bookmark images, and
wherein the controller is further configured to overlap a first bookmark image and a second bookmark image among the bookmark images each other and display the overlapped bookmark images when a difference between first time information regarding the first bookmark image and second time information regarding the second bookmark image is below a time threshold.

2. The display device according to claim 1, wherein the first bookmark image overlaps the second bookmark image when the first time information regarding the first bookmark image is earlier than the second time information regarding the second bookmark image.

3. The display device according to claim 2, wherein the controller is further configured to detect a first control input to select the first bookmark image, and play back the video images starting from a frame corresponding to the first frame information regarding the first bookmark image.

4. The display device according to claim 2, wherein the controller is further configured to detect a second control input to replace the first bookmark image with the second bookmark image, and overlap the first bookmark image with the second bookmark image, the second control input being a hovering input of hovering over the display unit.

5. The display device according to claim 2, wherein the controller is further configured to display an indicator with regard to the second bookmark image overlapped by the first bookmark image.

6. The display device according to claim 4, wherein the controller is further configured to detect a third control input to select the second bookmark image, and play back the video images starting from a frame corresponding to second frame information regarding the second bookmark image.

7. The display device according to claim 1, wherein the first bookmark image and the second bookmark image are sequential images.

8. The display device according to claim 1, wherein the controller is further configured to detect a fourth control input to spread the overlapped first bookmark image and second bookmark image, and spread and display the first bookmark image and second bookmark image.

9. The display device according to claim 8, wherein the controller spreads the first bookmark image and the second bookmark image up and down when a difference between time information regarding the first bookmark image and time information regarding the second bookmark image is below a first time threshold.

10. The display device according to claim 9, wherein the controller spreads the first bookmark image and the second bookmark image next to each other when the difference between time information regarding the first bookmark image and time information regarding the second bookmark image exceeds the first time threshold and is below a second time threshold.

11. The display device according to claim 10, wherein the controller is further configured to detect a fifth control input to the spread first bookmark image or the spread second bookmark image, and play back the video images starting from a frame corresponding to frame information regarding the first bookmark image or the second bookmark image in response to the fifth control input.

12. The display device according to claim 1, wherein the playback screen of the video images further includes a playback indicator, and wherein the controller is further configured to play back the video images starting from the beginning when a control input to the playback indicator is detected.

13. The display device according to claim 1, wherein the bookmark images are still images captured during recording of the video images.

14. The display device according to claim 13, wherein time information regarding the respective bookmark images represent points in time when the still images are captured respectively.

15. The display device according to claim 1, wherein each of the bookmark images is equal to a frame, among the video images, corresponding to frame information regarding the corresponding bookmark image.

16. The display device according to claim 1, further comprising a camera unit configured to record the video images,
   wherein, upon recording of the video images via the camera unit, the controller is further configured to:
   display a video image trigger and a still image trigger,
   record the video images when the video image trigger is selected, and
   capture a still image from the video images when the still image trigger is selected during recording of the video images, and displays a thumbnail image of the captured still image.

17. The display device according to claim 16, further comprising a storage unit configured to store images,
   wherein the display device associates the recorded video images and the still image captured during recording of the video images with each other, and
   wherein the video images and the still image are stored in the storage unit.

18. The display device according to claim 17, wherein the display device stores the video images and the still image in the same folder.

19. The display device according to claim 17, wherein the controller is further configured to store the still image as the bookmark image, and store the time information and the frame information regarding the bookmark image in the video images.

20. A control method of a display device, the method comprising:
   displaying a playback screen of video images, wherein the playback screen of the video images contains one of the video images and a progress bar configured to visualize the progression of the video images;
   acquiring time information regarding respective bookmark images associated with the video images, wherein the bookmark images respectively include at least one of the time information in the video images and frame information regarding one of the video images corresponding to the time information; and
   displaying the bookmark images close to the progress bar at positions corresponding to the time information regarding the respective bookmark images,
   wherein a first bookmark image and a second bookmark image among the bookmark images are displayed as overlapping each other when a difference between first time information regarding the first bookmark image and second time information regarding the second bookmark image is below a time threshold.

* * * * *